Nov. 23, 1965  E. CASTELLANI ETAL  3,219,152
TRUCK HOLDING DEVICE
Filed Aug. 29, 1963
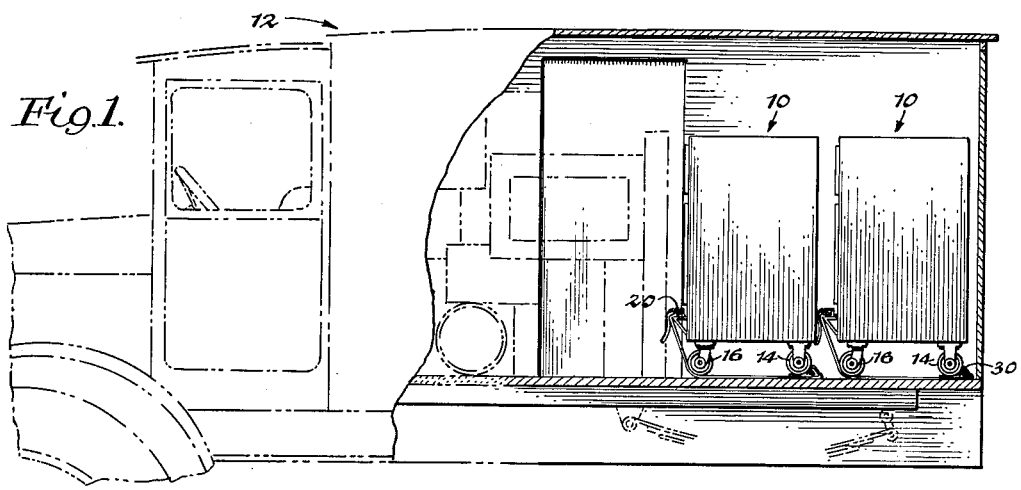
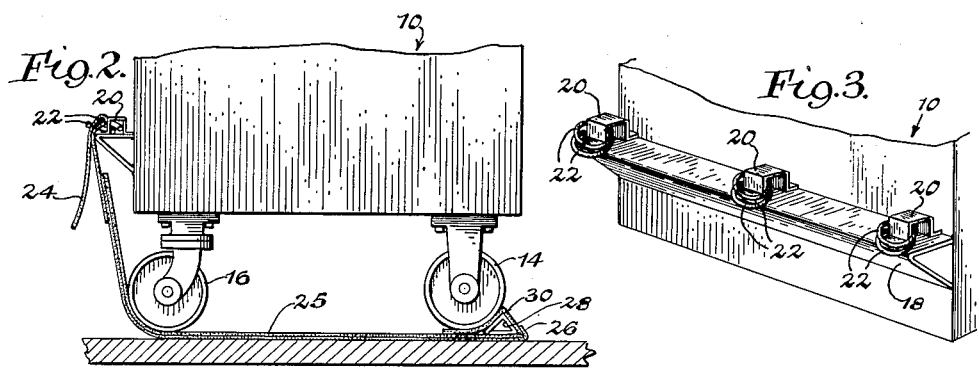
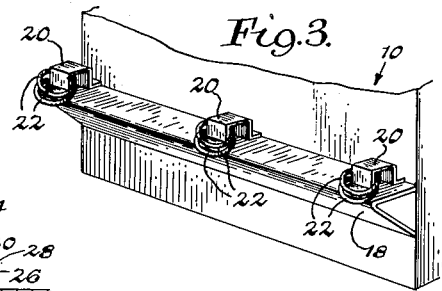
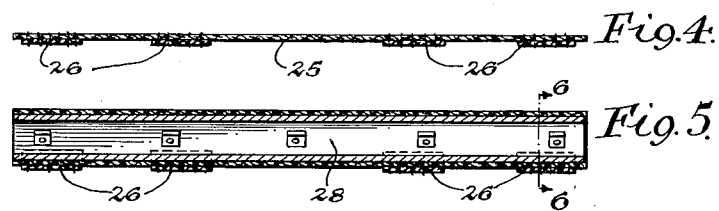
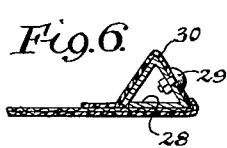
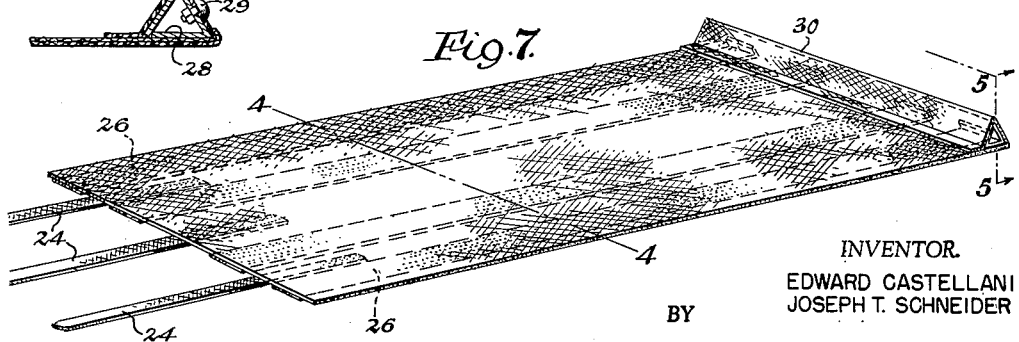
INVENTOR.
EDWARD CASTELLANI
JOSEPH T. SCHNEIDER
BY
Bean, Brooks, Buckley + Bean
ATTORNEYS

United States Patent Office 3,219,152
Patented Nov. 23, 1965

3,219,152
TRUCK HOLDING DEVICE
Edward Castellani, Williamsville, and Joseph T. Schneider, Buffalo, N.Y., assignors to Pacific Transportation Lines, Inc., Buffalo, N.Y.
Filed Aug. 29, 1963, Ser. No. 305,296
2 Claims. (Cl. 188—4)

This invention relates to cargo holding devices for use in motor vans, railway freight cars, cargo vessels, or the like; wherein pluralities of wheeled crates, boxes, pallets, or other containers carrying merchandise or the like are being transported. More particularly, the invention relates to means for preventing shifting during transport of wheeled containers under the aforesaid conditions; and especially such containers having castering wheels.

Wheeled cargo containers are particularly propense to shifting during transit, especially if some of their support wheels are of the freely castering type; and although various devices have been heretofore proposed for blocking such shifting tendencies during transit, such prior devices have been found to be deficient for the intended purpose and otherwise disadvantageous for various reasons.

It is a primary object of the present invention to provide a structurally simple, rugged, foolproof, and inexpensively fabricated device for use when stowing a wheeled container in a transportation van or the like, the purpose of which is to prevent any accidental shifting movements of the container while in transit.

Another object is to provide an improved container arrangement for goods transportation purposes, including means adapted to be placed with ease and enhanced facility between the container wheels and the van floor so as to preclude any unintended movements of the container in the van, in spite of constant shifting of the van floor angle and accelerations-decelerations of the van motions, such as during normal highway, railway, seaway, or airline travel.

By way of example the present invention is illustrated by the accompanying drawing wherein:

FIGURE 1 is a partial side elevational view of a carrying van; portions being broken away to show therewithin a pair of goods containers stowed in accordance with the present invention;

FIGURE 2 is a fragmentary close up view of one of the containers and its stowage arrangement;

FIGURE 3 is a fragmentary front perspective view showing a detail of the device;

FIGURES 4 and 5 are sectional views taken along lines 4—4 and 5—5 of FIGURE 7, respectively;

FIGURE 6 is a fragmentary sectional view taken along line 6—6 of FIGURE 5; and

FIGURE 7 is a top perspective view of a holding device of the present invention disposed flatwise upon a van floor, preparatory to reception of a wheeled container thereon.

The drawings herewith illustrate, by way of example only, a cargo container of the frozen food locker type as indicated generally by the numeral 10, modified as shown in FIGS. 1–3 to include means accommodating employment of a stowage means of the invention; whereby as shown in FIG. 1 such containers may be loaded into a transport van or the like as indicated generally at 12, in such manner as to be secured against accidental rolling or positional shifting in the van during transport.

As shown in FIGS. 1 and 2, the containers 10 run on paired wheel sets 14 and 16; the wheel sets 16 being illustrated to be of the freely castering type, as is typical in this industry.

For the purposes of the present invention the containers 10 are equipped with tie engaging means illustrated herein by way of example to include a cross bracket 18 which may be welded or otherwise suitably affixed to one end panel of the container 10 at a slight elevation above the castering wheels 16. Holders 20 are in turn fixed to the bracket 18 at suitable positions therealong to carry loosely held pairs of links 22 adapted to receive in threaded relation therethrough the free ends of holding straps 24. The straps 24 extend from one end of a flexible but rugged pad 25 which is dimensional to adapt it to lie flatwise on the van floor beneath the area covered by the container 10 while its strap-carrying end portion is extended to "wrap" upwardly under and ahead of the wheels 16 into the portions shown in FIGS. 1 and 2. Pad reinforcing strips as indicated at 26 may be sewn or riveted or adhesively attached to the pad as shown in the drawing. At its other end the pad 25 is formed with an abutment portion to "back up" the container wheels 14, and this purpose is preferably accomplished by inserting a triangularly sectioned stiffener 28 within the reverse rolled end portion of the pad; thereby providing an abutment portion 30 extending transversely of the end of the pad 25. The pad and strap parts may, of course, be fabricated of any preferred materials such as heavy canvas, webbing, plastic, or other suitably strong and flexible materials.

Thus, it will be appreciated that preparatory to loading a container into its designated position is a transport van or the like, a pad of the type illustrated and described hereinabove will be laid flatwise on the van floor over the area to be occupied by the container. The container will thereupon be rolled into position upon the pad with one set of wheels pressing solidly against the abutment 30 at the rear end of the pad. The strap or straps 24 at the other end of the pad are then threaded through the buckle links 22—22 at the front end of the container and pulled hard into firmly snugging and locked relation, whereby the front end of the pad 25 is drawn up into snug fitting relation with the wheels 16. Thus, the wheels are not only prevented from rolling on the pad (and van floor) but also are prevented from turning on their swivel axes. Hence, the wheels of the container are now all locked against any kind of motion, and the container is thus firmly held against any form of positional shifting in the van until such time as the straps are released and the front end of the pad 25 is lowered to "floor rug" position. The container may then be run off the pad and unloaded from the van in the customary manner.

Whereas only one form of the invention has been illustrated and described in detail hereinabove, it will be understood that various changes may be made therein without departing from the spirit of the invention or the scope of the following claims.

We claim:
1. A load handling device comprising, in combination, a cargo container having a body and pairs of wheel sets dirigibly supporting said body for movement in either direction along a given path,
a bracket mounted on said body above the level but adjacent to one of said wheel sets, and holder means secured to said bracket, an elongate flexible mat lying upon a surface supporting said device and upon which both of said wheel sets rest, said mat having an upstanding abutment device at one end thereof engaging against the wheel set remote from said bracket and said mat being of a length to extend, with said abutment device engaged against the remote wheel set as aforesaid, beneath such remote wheel set and beneath said one wheel set and to pass therefrom upwardly toward but terminating short of said bracket, and tie means connected to said end of the mat remote from said abutment device and detachably engaged with said holder means to maintain said mat in tensioned condition throughout with said abutment device firmly engaged against the remote wheel set, whereby the device is prevented from rolling in either direction along said path.

2. The combination as defined in claim 1 wherein said abutment device is in the form of a triangular stiffener enclosed by said mat at said one end thereof.

References Cited by the Examiner

UNITED STATES PATENTS

| | | | |
|---|---|---|---|
| 2,252,878 | 8/1941 | Bella et al. | 188—4 |
| 2,822,890 | 2/1958 | Kriewaldt | 188—32 |

FOREIGN PATENTS 1,119,191   4/1956   France.

MILTON BUCHLER, *Primary Examiner.*

DUANE A. REGER, ARTHUR L. LA POINT,
*Examiners.*